Sept. 27, 1949.  R. MOORE  2,482,789
CIRCUMFERENTIALLY TRAVELING TYPE
TIRE MOUNTING DEVICE
Filed Jan. 17, 1946  2 Sheets-Sheet 1

INVENTOR
ROOSEVELT MOORE

BY
HIS ATTORNEYS

Sept. 27, 1949.    R. MOORE    2,482,789
CIRCUMFERENTIALLY TRAVELING TYPE
TIRE MOUNTING DEVICE
Filed Jan. 17, 1946    2 Sheets-Sheet 2
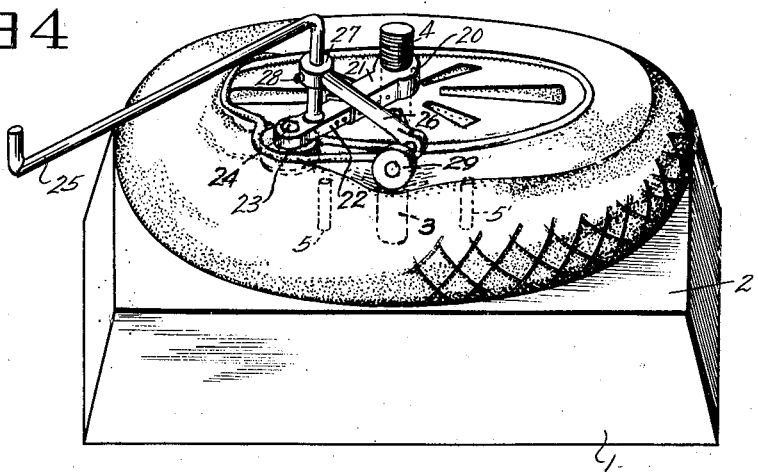
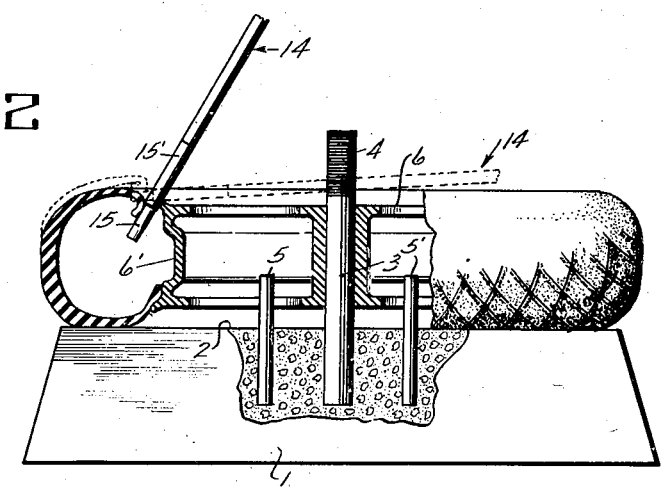
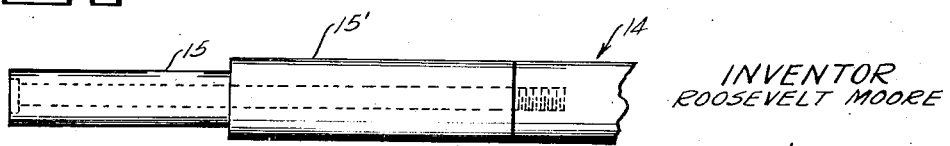
INVENTOR
ROOSEVELT MOORE
HIS ATTORNEYS Patented Sept. 27, 1949

2,482,789

UNITED STATES PATENT OFFICE 2,482,789

CIRCUMFERENTIALLY TRAVELING TYPE TIRE MOUNTING DEVICE

Roosevelt Moore, Orange, N. J.

Application January 17, 1946, Serial No. 641,858

4 Claims. (Cl. 157—1.24)

(Granted under the act of March 3, 1883, as amended April 30, 1928; 370 O. G. 757)

The invention described herein may be manufactured and used by or for the Government for governmental purposes without payment to me of any royalty thereon.

The present invention relates to a tire handling and tire changing apparatus for the expeditious removal and remounting of resilient tires with respect to wheels, and is particularly intended for use with tires having spaced inner beads adapted for engagement with spaced bead retaining flanges on the wheels.

The main object of the invention is to provide tire handling tools capable of use with heavy tires and operable by the manual effort of a single worker.

A further object is to provide a firm support for tires to be removed or remounted and to combine with said support, means to operably support the elements which are manipulated in removing and remounting the tires.

Another object is to simplify tire changing procedure by the use of special tire handling apparatus, and to provide such apparatus which is reliable and of universal application to tires ranging in size and shape.

It is a primary object to generally improve the construction of tire changing tools, and to eliminate the use of makeshift tire irons which tend to slow up tire changing operations and which may even damage the tire and tube.

The above stated and other objects of invention will become apparent upon reading the following detailed description in connection with the drawings, in which:

Fig. 2 illustrates the tire removing apparatus in use.

Fig. 3 is a fragmentary view of a lever and roller member used with the apparatus of Fig. 2.

Fig. 4 illustrates the tire remounting apparatus in use.

Figure 1:
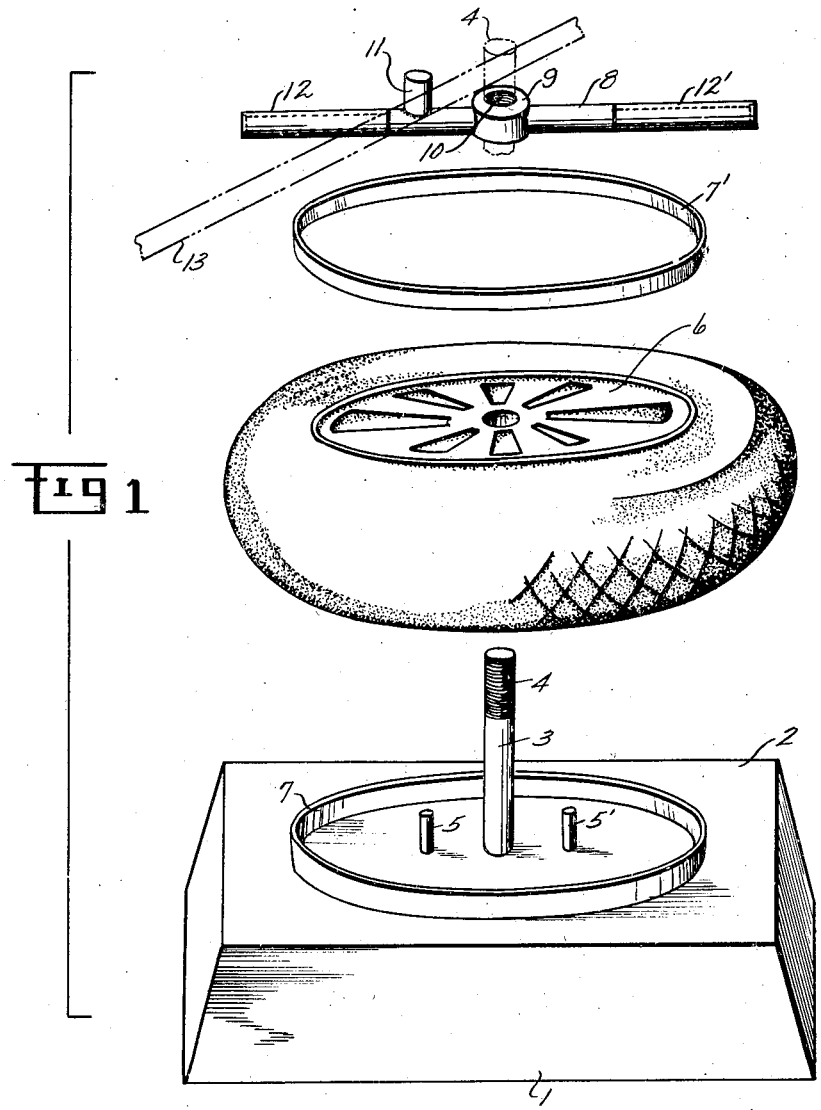
Fig. 1 shows an exploded view of an apparatus for breaking a tire loose from the wheel.

Referring to the drawings, Fig. 1 illustrates the tire breaking form of the invention, which like all the forms disclosed may include a supporting base 1 which is of concrete or any suitable material to provide an upper work supporting face 2. The upper face is preferably horizontal and of ample proportions to carry a wide range of tire and wheel sizes. Centrally of the base 1 there is provided a pivot post 3 firmly fixed in the base and having a screw-threaded upper end 4. Spaced from the post on diametrically opposite sides thereof, there is a pair of stop pins 5 and 5' receivable in radially extending openings formed in the wheel 6, when the wheel is mounted on post 3. Prior to placing the wheel over the pivot post 3 with the wheel centered thereon, a ring 7 is first placed on the base 1. The ring 7, like the upper ring 7', has an inside diameter just slightly greater than the outside diameter of the wheel, so that the rings can be used to exert pressure on the tire side walls close to the tire bead and close to the wheel.

To exert pressure on the tire breaking rings 7 and 7' the clamping bar 8 is provided, having a hub 9 with a central screw-threaded opening 10. At one side of the hub the bar carries an abutment pin 11, and at each end there is a roller, 12 or 12', of considerable extent along the bar so as to be operable with a wide range of ring sizes.

The tire breaking apparatus disclosed is particularly effective in loosening tires which have become tightly adhered to the wheel, and in use the apparatus is not only powerful in its action but also avoids excessive and undesirable strain on the tire, as well as on the operator removing the tire from the wheel. The tire loosening action is applied evenly by the rings all the way around the tire, and any force exerted on the tire is transmitted thereto only through the rings.

After the rings and tire are sandwiched together on the base 1 with the pins 5 and 5' arranged to prevent wheel rotation, the clamping bar 8 is threaded over the post 3 and tightened down to contact the ring 7'. Then an operating lever 13 is used as shown in Fig. 1 to rotate the bar and force the rings 7 and 7' toward each other. In practice it is found that the upper tire bead usually loosens up first allowing the ring 7' to drop and bringing the rollers 12 and 12' into pressure engagement with the upper wheel edge flange. Continued downward pressure exerted by the bar then forces the wheel downwardly inside of the lower ring 7 to break the tire loose along the lower bead. The bar operating lever 13 may be an ordinary crow-bar or other similar member, and as shown is placed between the post 3 and abutment pin 11 with one end projecting out a substantial distance. The inner end of the lever may be engaged against the hub 9 to avoid damage to the threaded post 3, but in any case is used merely to obtain leverage in rotating the bar 8.

It is to be understood that the bar 8 may vary in construction considerably and the mounting of rollers 12 and 12' thereon may take various forms. Thus various antifriction mountings may be employed when desired, and the bar may be drilled lengthwise for grease passages to permit a suitable lubricant to be forced between the rollers and the bar under pressure. For this purpose a pressure-gun grease nipple may be provided at each end of bar 8.

Having loosened the tire from the wheel the bar 8, rings 7 and 7' and the wheel 6 are removed from the supporting base 1. Then to complete removal of the tire, the wheel having the loosened tire thereon is again placed on the base as illustrated in Fig. 2. The tire removal procedure involves the use of a combined lever and bead roller member 14 comprising a long bar with two contiguous rollers 15 and 15' mounted thereon. The roller 15 at the extreme end of the member 14 is of a slightly smaller diameter than the roller 15' to provide a shoulder, limiting insertion of the member 14 and also forming a guide means for the rollers.

With the tire loose on the wheel, the member 14 may be inserted between the upper flange of wheel 6 and the adjacent tire bead, until the member 14 reaches the position as showed by solid lines in Fig. 2. Then the member 14 is lowered to the dotted line position to lift a portion of the tire bead off the wheel, and to position the member 14 close against one side of the post 3. The member 14 is then turned about the post by effort exerted near its free end, the continuous rolling action of rollers 15 and 15' acting to lift the tire bead off the wheel, clear around the wheel. The member 14 is then removed and the other tire bead is pushed toward the drop-center portion 6' of the wheel 6 at one side thereof, to allow the tire to be pulled upwardly at the diametrically opposite side and thus be removed completely from the wheel.

In remounting the tire on the wheel one bead of the tire is forced over the wheel flange far enough to bring the bead into the drop-center portion of the wheel 6 at one side and thus permit the other side of the bead to be forced over the bead retaining flange of the wheel. Then the wheel and tire are mounted on the base 1 with the center post 3 extending upwardly through the wheel hub, and with the other or unmounted bead of the tire facing upwardly. The complete remounting of the tire is then accomplished by the use of a tool as illustrated particularly in Fig. 4.

An alternative procedure for remounting the tire may be followed by first mounting the wheel 6 on the base 1 and then placing the tire over the wheel in an inclined position with one portion of the lower tire bead within the drop-center portion of the wheel. The remainder of the lower tire bead will then lie above and in overlapping relation to the top bead retaining flange of the wheel. This remaining portion of the bead may then be forced outwardly and downwardly over the flange by the use of the tool illustrated in Fig. 4. In a similar manner the upper tire bead is manipulated with the aid of the tool shown in Fig. 4, and thus the tire is completely mounted.

The post 3 secured in the supporting base 1 provides a spindle or pivot for rotatable support of the tire mounting device, which is adapted by its construction to exert pressure on the tire bead and simultaneously on the tire side wall to gradually force the tire down over the bead retaining flange. The device for accomplishing these results is shown in Fig. 4, and comprises a hub 20 having a sleeve 21 of rectangular cross-section secured thereto, the sleeve being adapted to receive an arm 22 in slidably adjustable relation.

The sleeve and arm are provided with a plurality of transverse openings closely spaced and adapted to have a bolt extended therethrough, for rigidly connecting the sleeve and the arm. Such an adjustable connection adapts the tire remounting device for use with a wide variation of tire and wheel sizes. Rotatably mounted at the outer end of arm 22 is a roller 23, carried on a vertical pivot member 24. The roller 23 has a peripheral edge face which is adapted to engage and roll along the inner edge of the tire bead (see Fig. 4) and thus force the bead outwardly.

In order to rotate the arm 22 about the center post 3 there is an upwardly and outwardly extending handle 25 fixed to the arm, the handle being made heavy enough to permit the application of considerable downward force on the arm 22. Adjustably mounted on the handle 24 there is an auxiliary pressure arm 26 having a collar 27 at the upper end, provided with a set-screw 28. The inclined arm 26 carries a wheel or roller 29 at its lower end, which is a follow-up roller bearing on the tire side wall adjacent to the tire bead. It has been found that if pressure is exerted on the side wall close to the location of the bead roller, the bead can be forced past the bead-retaining flange with less difficulty as the bead roller 23 contacts unmounted portions of the bead. As illustrated in Fig. 4 the tire remounting device is intended for clockwise rotation, but if desired the follow-up roller 29 and arm 26 can be turned about 180° to position the roller on the opposite side of the bead roller and permit the device to be used for counter-clockwise rotation.

The adjustable mounting of the arm 26 on the handle serves to change the relative position of the follow-up roller to achieve best results in the remounting of tires of various types and sizes. With a more flexible side wall as used on automobile tires, the roller 29 may be set lower with respect to the bead roller 23 than would be the case on very heavy truck or aircraft tires. Furthermore, it is to be understood that the follow-up roller 29 may have an edge contour to conform to the tire side wall, and may have rounded edges to preclude cutting of the side walls.

In adjusting the position of the arm 22 with respect to the sleeve 21 it is preferable to make the adjustment so that the circumferential edge face of the bead roller 23 is close to or in rolling contact with the bead-retaining flange of the wheel, as the roller is moved around the wheel and tire. Thus, the roller 23 is adapted to be forced downwardly past the flange and held at about the same level therewith, as it is moved around the wheel to progressively force the tire bead outwardly as the peripheral face of the roller is engaged in rolling contact with the bead. Also the outer edge of the roller 23 may have a tapered construction, to form the frustum of a cone with the end portion of smaller diameter downward. By this construction the lower face of the roller may extend below the bead-retaining flange, with an upper edge portion of the roller 23 bearing in rolling contact with the flange.

In starting the tire bead onto the wheel some extra force may be required, which may if desired be exerted directly to the arm 22 adjacent to the bead roller. However, after the bead is partly applied, the device is merely rotated slowly about the center post 3 with the application of a firm, even, downward pressure on the handle so that one complete revolution will finish the application of the tire bead to the wheel.

While the present tire handling apparatus has been described in connection with a tire carried on a drop-center wheel, it is to be understood that its use is in no way limited to use with tires or wheels of any specific type. On the other hand it may find application in removing and remounting tires on various wheels or rims, wherever it is desired to loosen a tire from a wheel, manipulate the tire bead for removal from a wheel, or apply a tire to a wheel by forcing the tire bead past a bead-retaining element.

The embodiments of the invention herein shown and described are to be regarded as illustrative only and it is to be understood that the invention is susceptible to variations, modifications and changes within the scope of the appended claims.

What I claim is:

1. A tire mounting device comprising, an arm having a bearing means for rotatable engagement with a relatively fixed pivot, a roller mounted near the outer end of said arm on an axis substantially parallel to said fixed pivot, a handle means fixed to said arm and adapted for use in rotating said arm about said fixed pivot, a portion of said handle means adjacent to said arm being parallel to said fixed pivot, a second arm adjustably clamped on said handle portion, and a roller mounted on the free end of said second arm.

2. A tire mounting device comprising, an arm having a bearing means for rotatable engagement with a relatively fixed pivot, said fixed pivot being adapted to extend through the hub of a wheel on which the tire is to be mounted, a roller mounted on said arm and having a peripheral face adapted for rolling contact with respect to the tire bead, a second arm fixed to the first arm and extending transversely thereof, a third arm mounted on said second arm and being rotatably and longitudinally adjustable with respect thereto, and a roller mounted on said third arm and having a peripheral face adapted for rolling contact with respect to the tire side wall.

3. A tire mounting device comprising, an arm having a bearing means for rotatable engagement with a relatively fixed pivot, said fixed pivot being adapted to extend through the hub of a wheel on which the tire is to be mounted, a roller mounted on said arm and having a peripheral face adapted for rolling contact with respect to the tire bead, means adjustably mounted on said arm and having a second roller carried thereby, said second roller having a peripheral face adapted for rolling contact with respect to the tire side wall, and said means being adjustable to move said second roller toward or away from the tire side wall and also toward or away from the said fixed pivot.

4. A tire mounting device comprising, a tire support having a central fixed post thereon adapted to extend through the hub of a wheel on which the tire is to be mounted, a first arm adjustable in length and having a bearing member at one end for rotatable engagement with said fixed post, a first roller carried on the outer end of said first arm and rotatably mounted on a pivot whose axis is parallel to the axis of said fixed post, a handle member fixed rigidly to said first arm and including a first portion extending transversely from said arm, a second portion extending transversely of said first portion and parallel to said arm and a third portion at the free end of said handle member forming a hand grip, a second arm extending from said first handle portion and being rotatably and longitudinally adjustable thereon, a second roller mounted on the free end of said second arm with its axis of rotation lying in a plane parallel to said tire support and perpendicular to the pivotal axis of said first roller, and said first and second rollers being adapted for rolling contact with the tire bead and the adjacent tire side wall respectively to simultaneously force the bead radially outwardly and the side wall axially inwardly toward said tire support.

ROOSEVELT MOORE.

REFERENCES CITED

The following references are of record in the file of this patent:

UNITED STATES PATENTS

| Number | Name | Date |
|---|---|---|
| 616,967 | Prescott | Jan. 3, 1899 |
| 759,123 | Nicolson | May 3, 1904 |
| 959,669 | Wiest | May 31, 1910 |
| 1,025,987 | Long | May 14, 1912 |
| 1,129,487 | Hart | Feb. 23, 1915 |
| 1,352,722 | Caldwell | Sept. 14, 1920 |
| 1,451,344 | Robinett | Apr. 10, 1923 |
| 1,548,136 | Grange | Aug. 4, 1925 |
| 1,587,634 | Dickey et al. | June 8, 1926 |
| 2,201,982 | Bazarek | May 28, 1940 |
| 2,437,512 | Ekse | Mar. 9, 1948 |

FOREIGN PATENTS

| Number | Country | Date |
|---|---|---|
| 260,823 | Germany | June 10, 1913 |

OTHER REFERENCES

Aviation Magazine, page 167, Nov. 1944.